(12) United States Patent
Huam

(10) Patent No.: US 8,781,786 B2
(45) Date of Patent: Jul. 15, 2014

(54) SPINDLE SPEED DETECTION THROUGH CURRENT SENSING DURING BOOST BRAKING

(75) Inventor: Chin Boon Huam, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 339 days.

(21) Appl. No.: 13/208,666

(22) Filed: Aug. 12, 2011

(65) Prior Publication Data
US 2013/0041620 A1  Feb. 14, 2013

(51) Int. Cl.
*G06F 15/00* (2006.01)
*G11B 19/28* (2006.01)
*H02P 6/18* (2006.01)
*H02P 6/16* (2006.01)
*B60L 11/18* (2006.01)

(52) U.S. Cl.
CPC  *G11B 19/28* (2013.01); *H02P 6/18* (2013.01); *H02P 6/165* (2013.01); *B60L 11/1807* (2013.01)
USPC ........ 702/142; 318/400.06; 388/800; 702/64; 702/65

(58) Field of Classification Search
CPC .......... G11B 19/28; G11B 5/54; G11B 19/20; G11B 21/12; H02P 3/22; H02P 6/06; H02P 6/14; H02P 6/18; H02P 25/028; H02P 6/165; B60L 11/1807; Y02T 10/642; Y02T 10/70; Y02T 10/7005
USPC ........... 702/72, 74, 78, 79, 96, 104, 116, 142, 702/145, 64, 65; 318/5, 368, 400.06, 318/400.27, 400.35, 567; 360/69, 75; 388/812, 820, 800; 73/66, 116, 448; 324/160, 161
See application file for complete search history.

(56) References Cited

U.S. PATENT DOCUMENTS

| | | |
|---|---|---|
| 5,866,998 A | 2/1999 | Menegoli |
| 6,005,359 A | 12/1999 | Brambilla et al. |
| 6,064,539 A | 5/2000 | Null et al. |
| 6,163,120 A | 12/2000 | Menegoli |
| 6,424,798 B1 * | 7/2002 | Kitamine ...................... 388/800 |
| 6,598,000 B1 | 7/2003 | Menegoli et al. |
| 6,693,400 B2 | 2/2004 | Pedrazzini et al. |
| 7,161,757 B1 | 1/2007 | Krishnamoorthy et al. |
| 7,705,548 B2 | 4/2010 | Galbiati |
| 7,956,561 B2 * | 6/2011 | Kanamori et al. ........ 318/400.06 |
| 2010/0246051 A1 | 9/2010 | Galbiati et al. |

* cited by examiner

*Primary Examiner* — John H Le
(74) *Attorney, Agent, or Firm* — Gardere Wynne Sewell LLP

(57) ABSTRACT

A circuit includes a comparator having input terminals configured to be coupled across a drive transistor adapted to drive a phase of a motor. The comparator senses a drive current of the motor phase, said sensed drive current represented by a periodic signal whose period is indicative of motor speed. A motor speed calculation circuit receives the periodic signal and processes the periodic signal to determine a speed of the motor.

31 Claims, 7 Drawing Sheets

SPINDLE SPEED DETECTION THROUGH CURRENT SENSING DURING BOOST BRAKING

BACKGROUND

1. Technical Field

The present invention relates generally to motor speed detection and, more particularly, to sensing the speed of a spindle motor.

2. Description of Related Art

A block diagram of a conventional disk drive system is shown in FIG. 1. The disk drive system includes a disk drive microprocessor 8, a control logic circuit 10, a voltage fault detector circuit 12, a set of voice coil motor drivers 14, a voice coil motor 16, a head carriage 20, a set of read/write heads 21, a magnetic media 22, a spindle motor 24, and a set of spindle motor drivers 26. The disk drive system is operated in the following manner. A host computer 4 communicates through a controller 6 to exchange commands and/or data with the disk drive microprocessor 8. The disk drive microprocessor 8 forwards the commands and/or data to the control logic circuit 10 which responds by directing the spindle motor drivers 26 to rotate the spindle motor 24 and the magnetic media 22 at a substantially constant velocity. The voice coil motor 16 moves the read/write heads 21 over specific tracks on the magnetic media 22 in response to commands from the control logic circuit 10. Once the read/write heads 21 have stabilized over the appropriate tracks, they can read data from or write data to the magnetic media 22 in a conventional manner.

In conventional disk drive systems such as the one shown in FIG. 1, the magnetic media 22 rotates at a high velocity and the read/write heads 21 are narrowly spaced from the surface of the magnetic media 22. In this environment, the read/write heads 21 may easily make contact with the magnetic media 22 in what is known as a head crash which can have catastrophic results. Data may be permanently lost. In addition, the read/write heads 21 or the magnetic media 22 may be damaged by the head crash to such an extent that the entire disk drive system no longer functions. Therefore, virtually all modem disk drive systems are designed to minimize contact between the read/write heads 21 and the magnetic media 22. To this end, many disk drive systems park their read/write heads 21 when the disk drive system is powered down such that the read/write heads 21 land on a parking zone on the magnetic media 22 rather than on an area of the magnetic media 22 which stores data. A parking zone is an area of the magnetic media 22 where data is not stored and is typically selected to be over tracks closest to a center of the magnetic media 22. This selection minimizes wear on tracks in the magnetic media 22 where data is stored and increases the reliability of the disk drive system and the integrity of the data it stores. Additionally, many disk drive systems minimize wear of the read/write heads 21 by braking their spindle motors 24 as quickly as possible to stop rotation and minimize the amount of time the read/write heads 21 are dragging on the magnetic media 22.

When power is first supplied to the disk drive system from a supply voltage, the operation of the disk drive system is inhibited by the voltage fault detector circuit 12 until the supply voltage is considered to have stabilized. At that time, the voltage fault detector circuit 12 pulls a power on reset signal or POR signal on a line 11 to a low voltage. Conversely, the voltage fault detector circuit 12 pulls the POR signal to a high voltage when the supply voltage drops below a safe operating voltage. In this latter case the control logic circuit 10 is powered by a capacitor 9 until the read/write heads 21 can be retracted and the spindle motor 24 is braked. In the disk drive system shown in FIG. 1, there is a substantial risk of a head crash if the spindle motor 24 is braked before the read/write heads 21 have been retracted.

In the event of a sudden lack of supply voltage, a procedure is implemented to first park the reading and writing heads, and then to stop the spindle motor once the heads have reached the parked position.

In the absence of supply voltage, the spindle motor serves as a voltage generator, the voltage of which depends on its rotational speed and its electric constant.

FIG. 2 shows the block diagram of a typical power combination used in applications for hard disks. The power combination is used to properly drive the voice coil motor 16 and the spindle motor 24 by using the VCM driver 14 circuitry and the spindle motor driver 26 circuitry. The VCM driver 14 circuitry includes a driving circuit 11 and a power stage 13. The power stage 13 includes two pairs of transistors M7-M8, M9-M10 with respective pairs of diodes D7-D8, D9-D10 connected in parallel with each other between a supply voltage Vm and ground GND. The voice coil motor 16 is coupled to the shared terminals of the pairs of transistors M7-M8, M9-M10. The spindle motor driver 26 circuitry includes a driving circuit 15 and a power stage 17. The power stage 17 includes three pairs of transistors M1-M2, M3-M4, M5-M6 with respective pairs of diodes D1-D2, D3-D4, D5-D6 connected in parallel with each other between supply voltage Vm and ground GND. The spindle motor 24 is coupled to the shared terminals of the pairs of transistors M1-M2, M3-M4, M5-M6.

The external supply voltage VCV feeding the power part varies according to the type of application; in desktop applications (desktop PC) it is of 12V, whereas in mobile applications (laptop PC) it is of 5V.

The Iso-Fet circuit 36 is an internal element of the power combination that serves to insulate the internal supply line Vm from the external supply line VCV if the latter were to fail. The Iso-Fet circuit 36 includes a transistor connected to the voltage VCV and controlled by signal P; said signal P is adapted to shut down the transistor of the Iso-Fet circuit 36 when the voltage VCV is null, whereas it is adapted to keep the transistor on when the voltage VCV is positive.

When the voltage VCV fails, the backelectromotive force voltage of the rotating spindle motor, i.e., the BEMF (Back-electromotive Force), is rectified to keep the internal supply line Vm at a potential high enough to supply the section of the voice coil motor 16 for parking the heads. This BEMF can be used to charge the capacitor 9 (in FIG. 1) or charge some other capacitor or energy storage device coupled to the potential line for the voltage supply Vm.

The rectification of the backelectromotive force of the rotating spindle motor may be carried out by means of one of the following procedures, i.e., a passive rectification, a synchronous rectification of the BEMF of the spindle motor or a step up of the spindle motor.

The passive rectification implies a rectification of the BEMF of the spindle motor through the intrinsic diodes of the power stage 17 which is operated at high impedance.

The synchronous rectification of the BEMF of the spindle motor takes place in an active manner through the sequential power up of two MOSFET transistors of the power stage 17 in synchronicity with the phase of the three backelectromotive forces of the coils L1-L3 of spindle motor 24.

The rectification by means of the spindle motor step up implies that the power stage 12 is continuously switched from a tristate condition to a braking condition at a frequency higher than 16-20 kHz (out of the audible range), instead of being kept under the tristate condition. Thereby, when the power stage 17 is under the braking condition (with all the low side transistors being switched on or all the high side transistor being switched on as shown in FIG. 3A), the spindle motor 24 is under a short-circuit condition and therefore the three backelectromotive forces are able to generate a current in the motor. When the power stage 17 is driven in tristate as shown in FIG. 3B, the three motor currents generated during the braking step recirculate through the intrinsic diodes of the six transistors of power stage 17, thus loading the capacitance (for example, capacitor 9) connected between the line where there is the voltage Vm and ground GND, keeping it at a high enough potential so as to supply the power stage 13 and voice coil motor 16 with sufficient power for parking the reading and writing heads. Said parking procedure typically begins when rectifying the BEMF of the spindle motor 24.

In an alternate implementation, referred to as active step up, is shown in FIG. 3C and is provided in substitution for the tristate condition of FIG. 3B. In active step up, the three motor currents generated during the braking step recirculate instead through actively driven ones of the six transistors of power stage 17, thus loading the capacitance (for example, capacitor 9) connected between the line where there is the voltage Vm and ground GND, keeping it at a high enough potential so as to supply the power stage 13 and voice coil motor 16 with sufficient power for parking the reading and writing heads.

The parking procedure of the reading and writing heads may be commonly carried out either at constant voltage or constant speed.

In the case of constant-voltage parking, the voice coil motor 16 is driven by the stage 13 applying a constant voltage for a certain time period T1, preset with an appropriate polarity for moving the heads in the correct parking direction, or the voice coil motor 16 is driven by the power stage 13 applying a first constant voltage for a time period T1 and a second constant voltage higher than the first voltage for another time period T2.

In the case of constant-speed parking, the voice coil motor is driven so as to keep the speed of reading and writing heads controlled during the parking procedure. Various methods are known in the state of the art to keep under control the speed by which the voice coil motor takes the reading and writing heads to a parked position. This type of procedure ends when the heads reach the parking zone; the control circuit also includes means such as a circuit or device adapted to detect when the reading and writing heads reach the parked position.

Once the reading and writing heads reach the parked position, the spindle motor 24 may be stopped; this generally occurs by short-circuiting the coils of the spindle motor through the activation of the low side transistors or high side transistors of the power stage 17 in a triple half bridge configuration. This procedure is commonly called "dynamic brake". Thereby, with the spindle motor being short-circuited, the BEMF thereof generates a braking current, which is a function of the amplitude of the generated BEMF, and therefore of the instant speed of the motor and the impedance of the motor coils.

In specific applications, such as the hard disks for high end applications, the rotational target speed is very high; the speeds for these applications typically range from 10,000 to 15,000 rpm. To achieve this speed, the impedance of the motor coils is made very low; in such a case, if the motor was placed under a short-circuit condition immediately after the parking procedure of the reading and writing heads, the current generated by the motor itself would have a value even higher than 5 or 6 amps.

In power combinations having the power stage with six transistors, such as the stage 17, such a current value very often exceeds the specification limits for the maximum current that may be driven by the power stage. For such a reason, due to reliability problems, at the end of the parking procedure the spindle motor braking may not be immediately activated through the power up of the low side transistors of the power stage 17, since the high current would damage the power stage 17. It is therefore required to wait for the speed of the spindle motor 24 to become lower than a predetermined speed Vf such that the generated BEMF then forces a lower current to the maximum level that may be controlled by the power stage when the spindle motor is short-circuited to activate its braking Therefore, in such a case, between the end of the heads parking step and the spindle braking activation there is a waiting time Ta in which it is controlled (by known means) when the speed of the spindle motor 24 becomes lower than the value Vf, so that the short-circuit of the coils thereof may be activated without the BEMF-generated current exceeding the specification limits of the power stage.

There would be an advantage if the speed of the spindle motor 24 could be determined for use at the very least in assisting with controlling the braking of the spindle motor after parking

SUMMARY

In an embodiment, a circuit comprises: a first comparator having input terminals configured to be coupled across a drive transistor adapted to drive a phase of a motor, the first comparator outputting a first periodic signal having a first period indicative of motor speed; and a motor speed calculation circuit having an input coupled to receive the first periodic signal, said motor speed calculation circuit configured to process the first periodic signal and determine the first period.

In an embodiment, a circuit comprises: a first comparator having input terminals configured to be coupled across a drive transistor adapted to drive a phase of a motor, the first comparator outputting a first periodic signal whose period is indicative of motor speed; and a motor speed calculation circuit having an input coupled to receive the first periodic signal, said motor speed calculation circuit configured to process the first periodic signal and determine the motor speed.

In an embodiment, a method comprises: sensing a drive current of a motor phase, said sensed drive current represented by a first periodic signal whose period is indicative of motor speed; and processing the first periodic signal to determine the motor speed.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
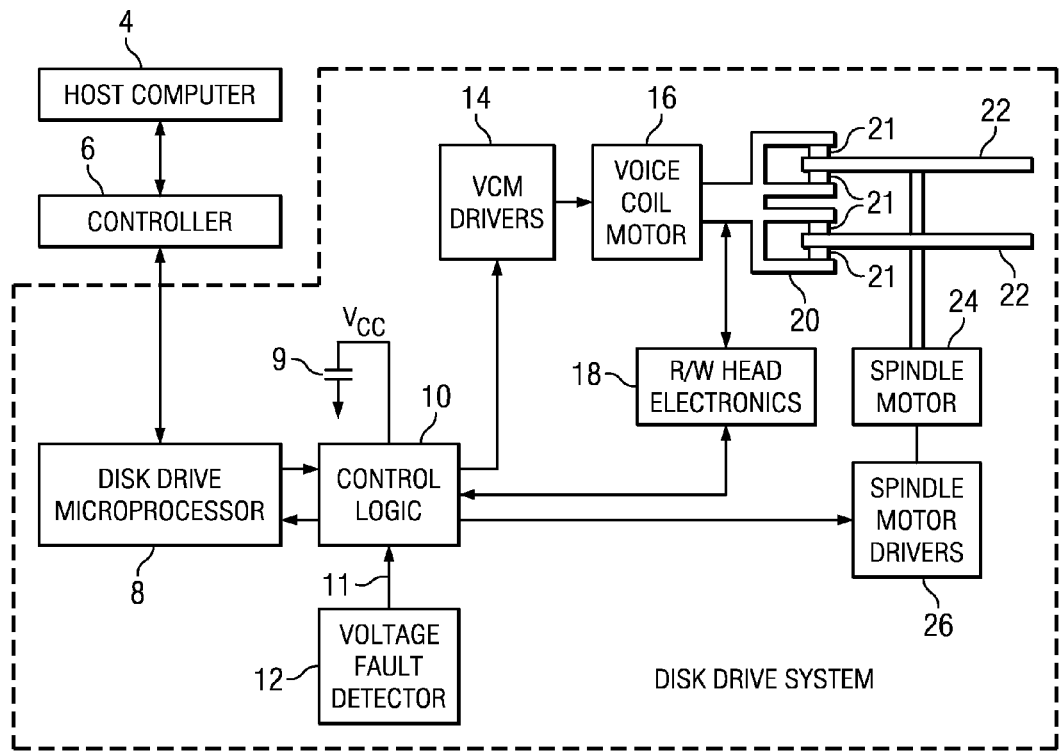
FIG. 1 is a block diagram of a conventional disk drive system.
Figure 3A:
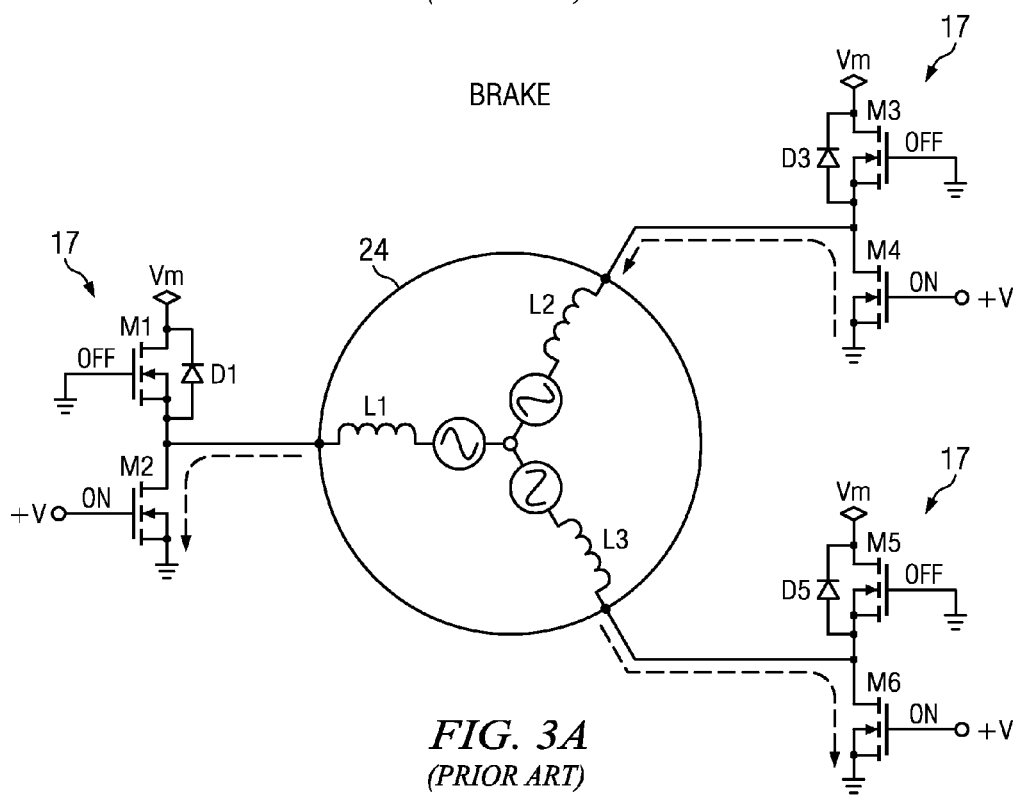
FIG. 3A illustrates operation of the typical power combination in braking mode.
Figure 2:
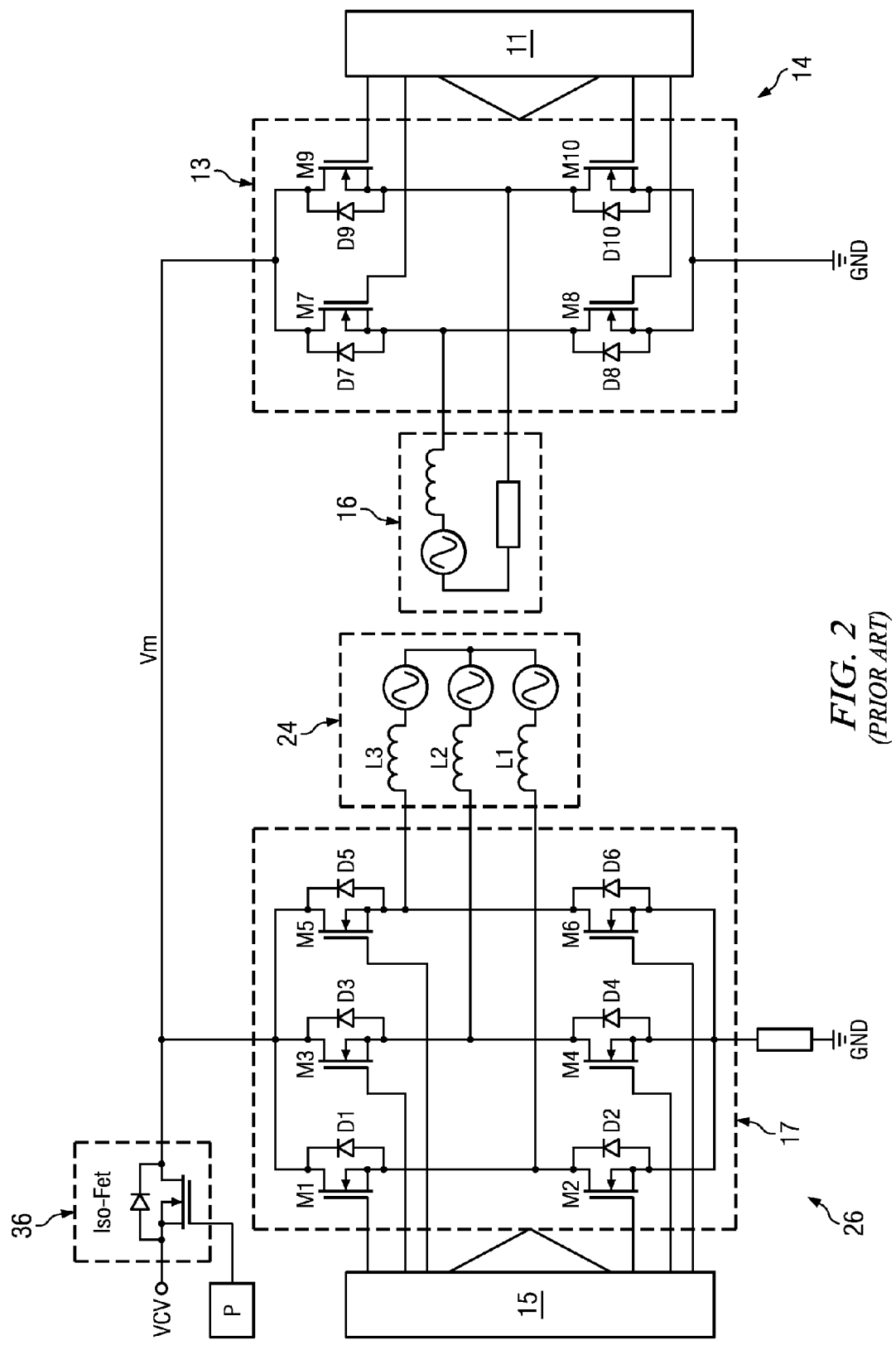
FIG. 2 is a block diagram of a typical power combination used in applications for hard disks.
Figure 3B:
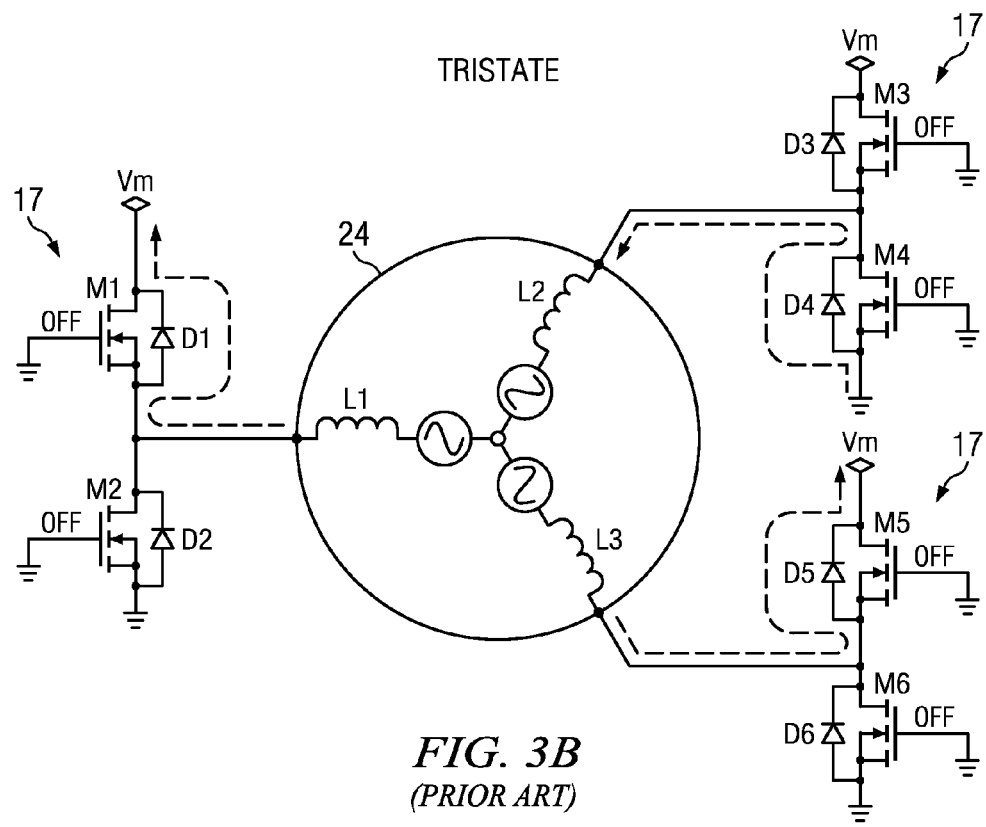
FIG. 3B illustrates operation of the typical power combination in tristate mode.
Figure 3C:
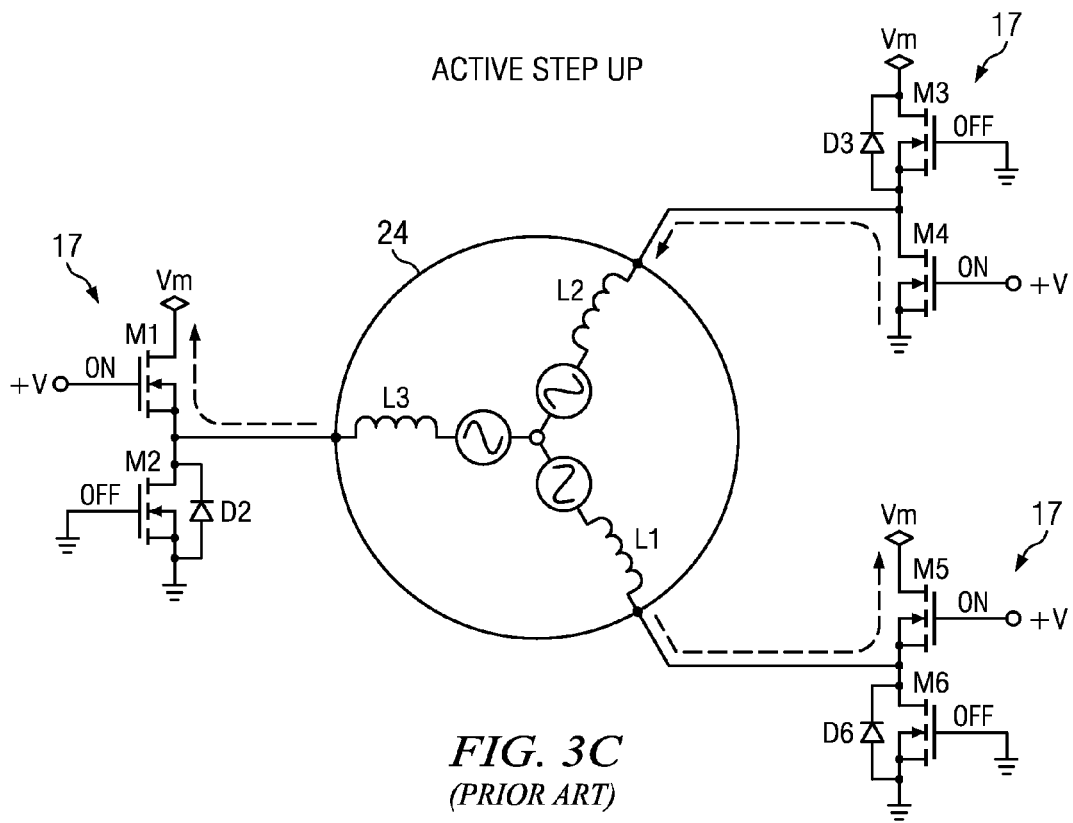
FIG. 3C illustrates operation of the typical power combination in active step up mode.
Figure 4:
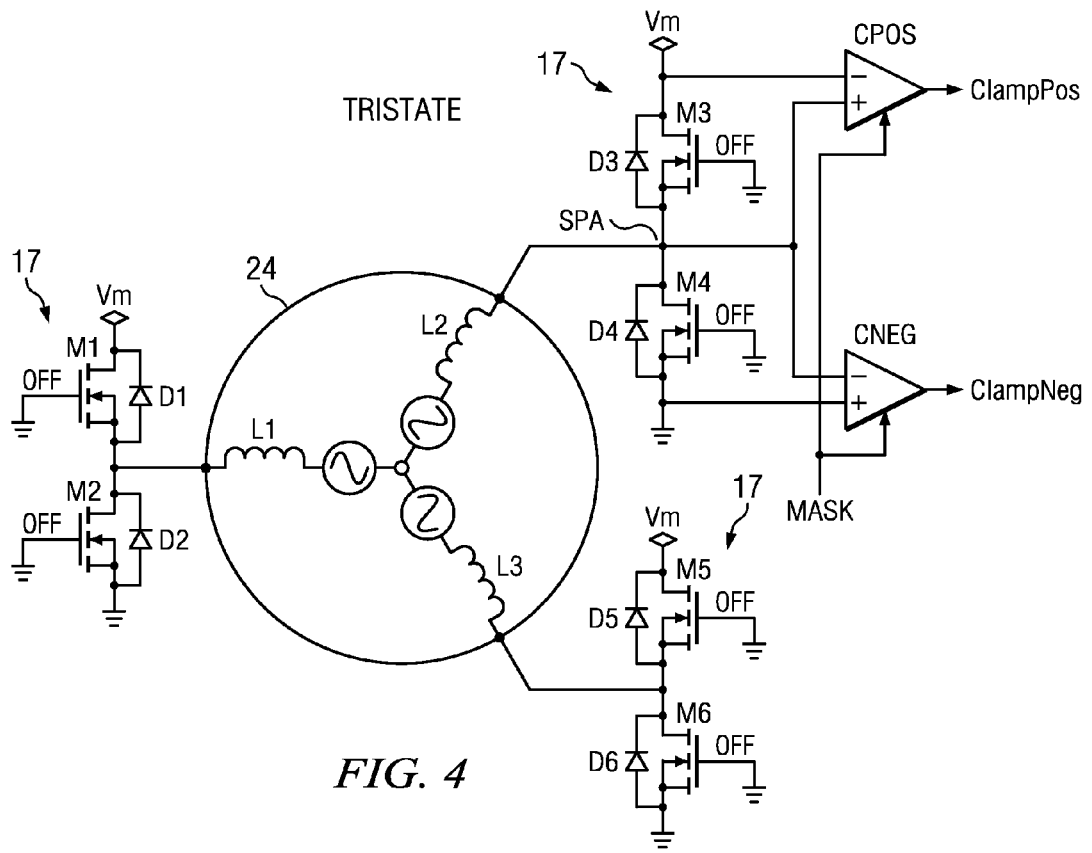
FIG. 4 illustrates operation in tristate mode with circuitry for detecting current flow and direction on one motor phase for use in making a speed measurement.

Reference is now made to FIG. 4. This FIG. 4 is similar to FIG. 3 in that it illustrates the state of operation for the motor 24 and drive circuits 26 when in tristate mode. FIG. 4 further illustrates a first comparator CPOS having input terminals coupled across the source-drain path of MOSFET M3. Specifically, a negative input terminal of comparator CPOS is coupled to the supply voltage Vm terminal and a positive input terminal of comparator CPOS is coupled to a node SPA, where node SPA is coupled to one phase terminal of the motor 24 and is positioned at the series connection point for the source-drain paths of MOSFETs M3 and M4. A second comparator CNEG has input terminals coupled across the source-drain path of MOSFET M4. Specifically, a negative input terminal of comparator CNEG is coupled to the node SPA and a positive input terminal of comparator CPOS is coupled to the ground voltage terminal.

FIG. 4 illustrates the pair of comparators coupled across the source-drain paths of MOSFETs M3 and M4. It will be understood that the pair of comparators could instead be coupled across the source-drain paths of any of the pairs of MOSFETs provided in the drive circuits 26 (for example, across MOSFETs M1 and M2, or across MOSFETs M5 and M6) as desired.

When the motor 24 and drive circuits 26 are configured for operation in tristate mode, the comparators CPOS and CNEG output signals (ClampPos and ClampNeg, respectively) which provide information indicative of the direction of current recirculation. Thus, the comparators CPOS and CNEG function as current sensing devices. The high side synchronous comparator, CPOS, generates an output signal ClampPos having a 'logic 1' state when recirculation current is flowing from the motor 24 into node SPA, through diode D3 of MOS transistor M3 to the voltage Vm (positive recirculation). Conversely, the high side synchronous comparator, CPOS, generates the output signal ClampPos having a 'logic 0' state when recirculation current is flowing through diode D4 of MOS transistor M4 and output of node SPA towards the motor 24 (negative recirculation). The low side synchronous comparator, CNEG, generates an output signal ClampNeg having a 'logic 1' state when recirculation current is flowing through diode D4 of MOS transistor M4 and output of node SPA towards the motor 24 (negative recirculation). Conversely, the low side synchronous comparator, CNEG, generates an output signal ClampNeg having a 'logic 0' state when recirculation current is flowing from the motor 24 into node SPA, through diode D3 of MOS transistor M3 to the voltage Vm (positive recirculation).

Figure 5:
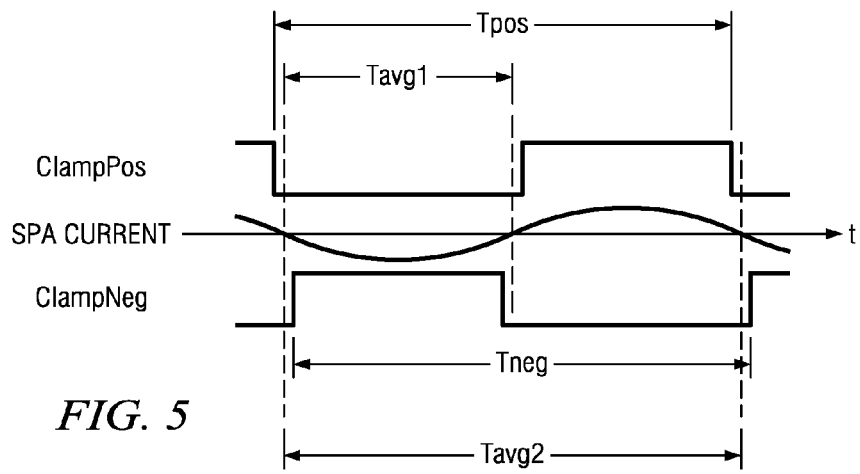
FIG. 5 is a timing diagram illustrating motor current in tristate mode along with output signals from the circuitry for detecting current flow and direction on one motor phase.

FIG. 5 shows waveforms for the output signal ClampPos and the output signal ClampNeg over time when the motor 24 and drive circuits 26 are configured for operation in tristate mode. FIG. 5 further shows an idealized sinusoidal waveform for the current at node SPA over time when the motor 24 and drive circuits 26 are configured for operation in tristate mode (it will be understood that the current at node SPA is not a perfect sinusoid, but rather is sinusoidal in character). The output signal ClampPos and the output signal ClampNeg are both periodic (with substantially (i.e., not necessarily exactly) a 50% duty cycle), the period of the output signals substantially matching the period of the sinusoidal SPA current and being a function of the spindle motor speed of rotation. Thus, by processing one or the other or both of the output signal ClampPos and the output signal ClampNeg, one can make a calculation of spindle motor speed during tristate mode. To accomplish this calculation, the period Tpos of the output signal ClampPos is determined and the speed of the spindle motor rotation, in RPM, is given by the equation 60/(number of pole pairs)*Tpos (in the illustrated example, the number of pole pairs is three). Alternatively, to accomplish this calculation, the period Tneg of the output signal ClampNeg is determined and the speed of the spindle motor rotation, in RPM, is given by the equation 60/(number of pole pairs)*Tneg (in the illustrated example, the number of pole pairs is three). Alternatively, to accomplish this calculation, the average period Tavg2 of both the output signals ClampPos and ClampNeg ((Tpos+Tneg)/2) is determined and the speed of the spindle motor rotation, in RPM, is given by the equation 60/(number of pole pairs)*Tavg2 (in the illustrated example, the number of pole pairs is three). Alternatively, accomplish this calculation, the average half-period Tavg1 of both the output signals ClampPos and ClampNeg is determined and the speed of the spindle motor rotation, in RPM, is given by the equation 60/(number of pole pairs)*2*Tavg1 (in the illustrated example, the number of pole pairs is three).

The measured periods or half-periods may be made with respect to a single period of the output signals ClampPos and ClampNeg, or alternatively may represent an average of measurements made over plural periods of the output signals ClampPos and ClampNeg, those plural periods being selected as either consecutive or non-consecutive periods, as desired.

Figure 6A:
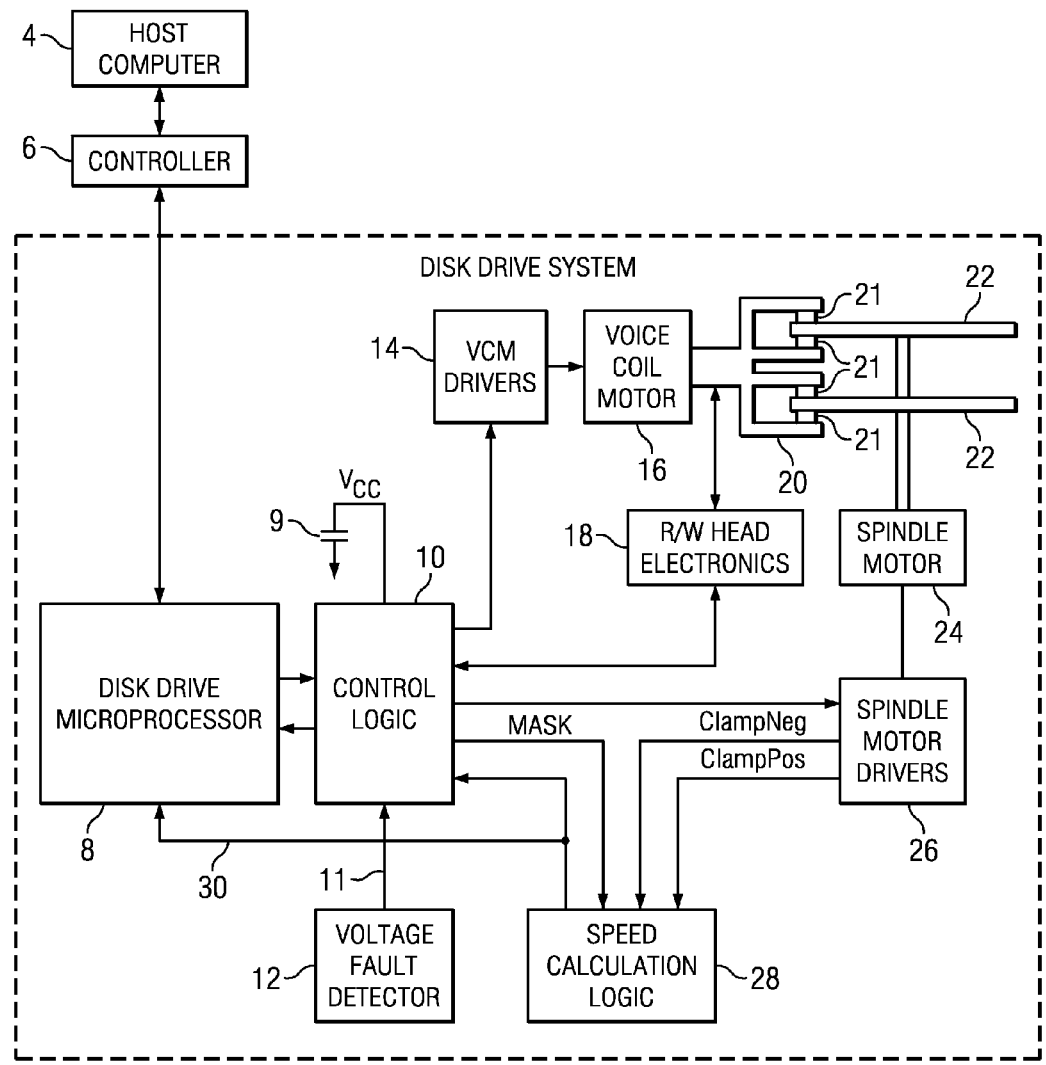
FIG. 6A is a block diagram of a disk drive system in accordance with an embodiment operable to make a speed measurement.

Reference is now made to FIG. 6A. The disk drive system may further include speed calculation logic 28. The speed calculation logic 28 receives at its inputs one or the other (or more preferably both) of the ClampPos and ClampNeg signals generated by the comparators CPOS and CNEG in FIG. 4. The speed calculation logic 28 processes the ClampPos and/or ClampNeg signals to make the period and/or half-period measurements discussed above, and then calculate the spindle motor speed. A speed signal 30 is generated and output from the speed calculation logic 28 for processing by one or the other or both of the control logic 10 and disk drive microprocessor 8.

Figure 6B:
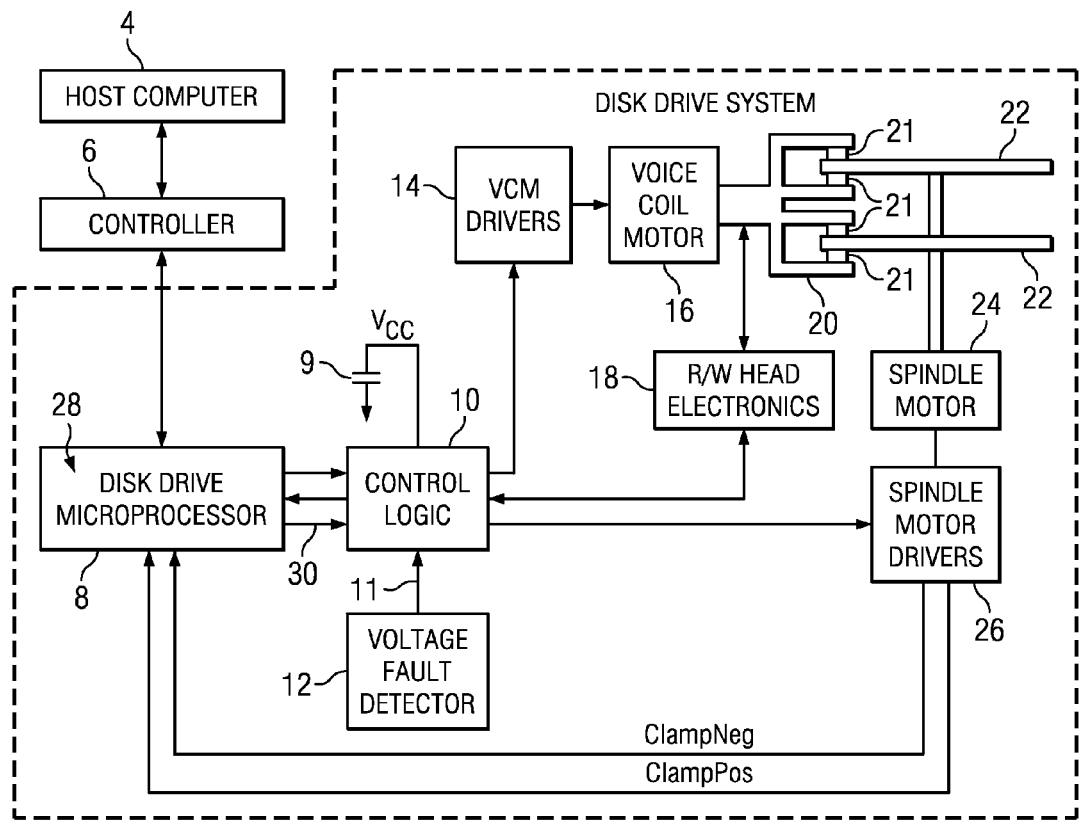
FIG. 6B is a block diagram of a disk drive system in accordance with another embodiment operable to make a speed measurement.
Figure 7:
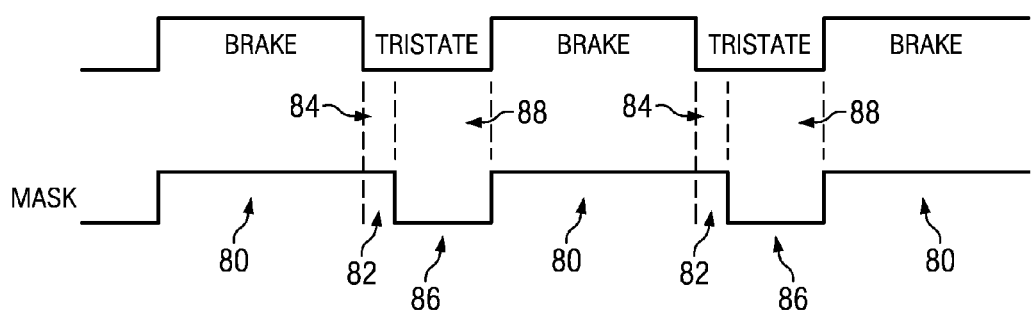
FIG. 7 is a timing diagram illustrating the use of a mask signal to control timing of making the speed measurement.

In an alternative embodiment shown in FIG. 6B, the one or the other (or more preferably both) of the ClampPos and ClampNeg signals generated by the comparators CPOS and CNEG in FIG. 4 are passed directly to the disk drive microprocessor 8. The disk drive microprocessor 8 would then include the speed calculation logic 28 and operate to process the ClampPos and/or ClampNeg signals to make the period and/or half-period measurements discussed above, and then calculate the spindle motor speed for its own use or for the use of the control logic 10 (through speed signal 30).

The speed calculation logic 28, whether implemented a separate logic as shown in FIG. 6A or within the disk drive microprocessor 8 as shown in FIG. 6B, may implement any of a number of techniques for making the period and/or half-period measurements discussed above. In one implementation, the speed calculation logic 28 is operable to sense rising and/or falling edges of the ClampPos and/or ClampNeg signals. Responsive to a sensed edge, a timer is started. Responsive to a subsequent sensed edge, the timer is stopped. The elapsed time measured by the timer provides the period measurement (where the sensed edges are consecutive edges of the same type—rising or falling) or provides the half-period measurement (where the sensed edges are of different type). The appropriate mathematical calculation is then performed to provide the speed output. Alternatively, since speed is a function of the elapsed time measured by the timer, the speed calculation logic 28 could instead simply output the elapsed time measurement itself as the speed output.

In another implementation, the speed calculation logic 28 is operable to sample the logic state of the ClampPos and/or ClampNeg signals. The number of consecutive samples taken by the speed calculation logic 28 without a change in logic state provides the half-period measurement. The number of consecutive samples taken by the speed calculation logic 28 to capture both logic states provides the period measurement. Since the sample rate is fixed and known, the number samples divided by the sample rate provides the elapsed time for the period and/or half-period measurement. The appropriate mathematical calculation is then performed to provide the speed output. Alternatively, since speed is a function of the elapsed time measured by the timer, the speed calculation logic 28 could instead simply output the elapsed time measurement itself as the speed output. Still further, since speed is a function of the number of samples taken, the speed calculation logic 28 could instead simply output the number of samples taken itself as the speed output.

It is important to ensure that the speed calculation logic 28 processes the ClampPos and/or ClampNeg signals for making the speed measurement only when the motor 24 and drive circuits 26 are configured for operation in tristate mode. As shown in FIG. 6A, the speed calculation logic receives a Mask signal from the control logic 10. The Mask signal is active at least during the entirety of the operating mode(s) other than tristate mode. The speed calculation logic 28 processes the ClampPos and/or ClampNeg signals to make the speed measurement when the Mask signal is not active. With reference to the implementation of FIG. 6B, the disk drive microprocessor 8 may itself generate and track the Mask signal or alternatively receive the Mask signal as generated by the control logic 10.

More preferably, so as to ensure processing of "clean" ClampPos and/or ClampNeg signals in tristate mode, it is preferred that the Mask signal be active not only during the entirety of the operating mode(s) other than tristate mode but also for a short time period after the transition is made to enter into the tristate mode.

The relationship between the Mask signal and the alternating brake and tristate modes of operation for the motor 24 and drive circuits 26 is shown in 7. The alternating brake and tristate modes of operation illustrate an approximate 65% duty cycle which is a typical (or perhaps even lower to avoid current limit) switching frequency above audio range. During PWM on time for the braking mode, the windings of the motor 24 will be shorted through the low side power transistors (M2, M4 and M6). Hence, a current will be developed in the windings due to bemf (due to motor's inertia). During PWM off time for the tristate mode, the phases of the motor will be tri-stated by turning off all of the power transistors M1-M6. The developed current then recirculates effectively so as to dump energy onto the capacitor associated with the Vm voltage node.

The Mask signal is active ('logic 1') 80 when the motor 24 and drive circuits 26 are configured in brake mode (see, also, FIG. 3A). When the motor 24 and drive circuits 26 transition from brake mode to tristate mode, the Mask signal remains active ('logic 1') 82. After a time delay 84, which allows for any undesired transient affects (noise, settling, and the like) in the ClampPos and/or ClampNeg signals to disappear, the Mask signal is de-asserted (not active, 'logic 0') 86. It is during this time period 88 when the speed calculation logic 28 processes the ClampPos and/or ClampNeg signals for making the speed measurement. Thus, the edge sensing, signal sampling, counting, and the like operations, discussed above for making the speed measurement are performed during the time period 88. When the motor 24 and drive circuits 26 transition back from tristate mode to brake mode, the Mask signal is again active ('logic 1') 80.

With reference once again to FIG. 4, in an alternative implementation the Mask signal could be applied to the comparators CPOS and CNEG (perhaps as an enable signal) such that the ClampPos and/or ClampNeg signals are output from the comparators CPOS and CNEG only when the Mask signal is de-asserted (not active).

Figure 8:
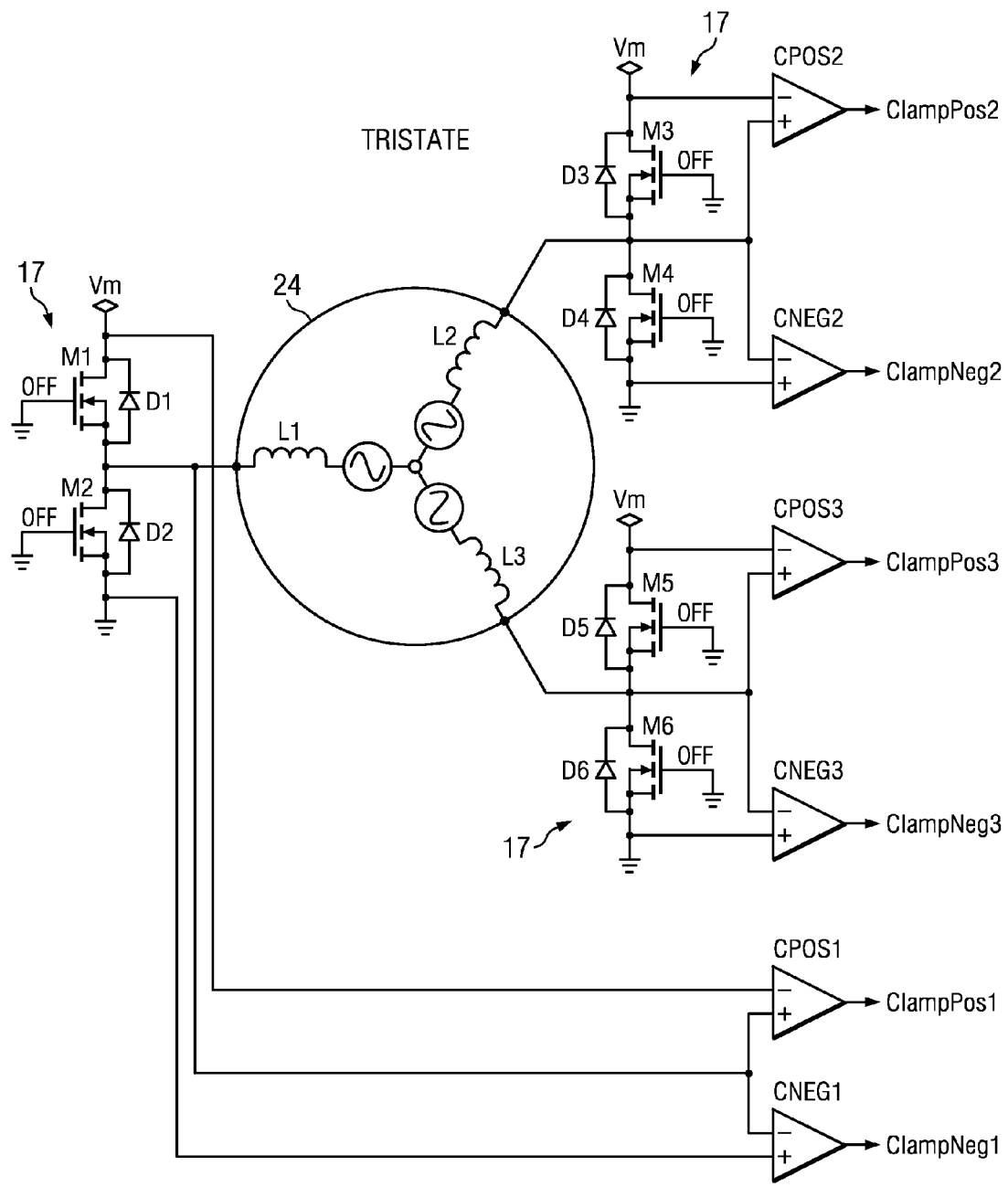
FIG. 8 illustrates operation in tristate mode with circuitry for detecting current flow and direction on three motor phases for use in making a speed measurement.

Although FIG. 4 illustrates the use of a single pair of comparators CPOS and CNEG relating to a single motor phase, it will be understood that a pair of comparators CPOS and CNEG can be coupled to more than one and indeed to each motor phase drive circuit 26. This implementation is shown in FIG. 8. The output signals from the three pairs of comparators CPOS1-CPOS3 and CNEG1-CNEG3 are the ClampPos1-ClampPos3 signals and the ClampNeg1-ClampNeg3 signals. In this embodiment, with reference to FIGS. 6A and 6B, the ClampPos and/or ClampNeg signals are understood to include the ClampPos1-ClampPos3 signals and the ClampNeg1-ClampNeg3 signals. The speed calculation logic 28 can process any one or more of the available supplied ClampPos and/or ClampNeg signals for making the speed measurement. Motor speed detection accuracy will be further improved by making use of the ClampPos1-ClampPos3 signals and the ClampNeg1-ClampNeg3 signals output from the pairs of comparators CPOS1-CPOS3 and CNEG1-CNEG3 provided on all motor phases. The electrical period of each phase would be measured by the pair of comparators for that phase. More accurate speed information can be obtained by averaging the electrical period measured from each of the motor phases.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:
1. A circuit, comprising:
a first comparator having a first input terminal configured to receive a first voltage at a first conduction terminal of a drive transistor adapted to drive a phase of a motor and having a second input terminal configured to receive a second voltage at a second conduction terminal of the drive transistor, the first comparator configured to com- pare the first and second voltages and output a first periodic signal having a first period indicative of motor speed; and a motor speed calculation circuit having an input coupled to receive the first periodic signal, said motor speed calculation circuit configured to process the first periodic signal and determine the first period.

2. The circuit of claim 1, wherein the motor speed calculation circuit is further configured to process the determined first period and calculate a speed of the motor.

3. The circuit of claim 1, wherein first periodic signal is a digital signal including signal edges, and wherein said motor speed calculation circuit is configured to determine the first period by measuring a time between signal edges.

4. A circuit, comprising:
a first comparator having input terminals configured to be coupled across a drive transistor adapted to drive a phase of a motor, the first comparator configured to output a first periodic signal having a first period indicative of motor speed; and
a motor speed calculation circuit having an input coupled to receive the first periodic signal, said motor speed calculation circuit configured to process the first periodic signal and determine the first period;
wherein the motor is operable in a brake mode and a tristate mode, and wherein the motor speed calculation circuit is further configured to process the first periodic signal and determine the first period only during a portion of the tristate mode.

5. The circuit of claim 4, wherein said portion of the tristate mode is less than all of the tristate mode.

6. The circuit of claim 4, wherein the motor speed calculation circuit receives a mask signal, said mask signal being active during the brake mode and inactive during said portion of the tristate mode, said motor speed calculation circuit being further configured to process the first periodic signal and determine the first period when the mask signal is inactive.

7. The circuit of claim 4, wherein the first comparator receives a mask signal, said mask signal being active during the brake mode and inactive during said portion of the tristate mode, said first comparator being further configured to output the first periodic signal, when the mask signal is inactive.

8. A circuit, comprising:
a first comparator having a first input terminal configured to receive a first voltage at a first conduction terminal of a drive transistor adapted to drive a phase of a motor and having a second input terminal configured to receive a second voltage at a second conduction terminal of the drive transistor, the first comparator configured to compare the first and second voltages and output a first periodic signal having a first period indicative of motor speed, wherein the first comparator is configured to sense voltages at one of a high side or low side drive transistor;
a second comparator having a first input terminal configured to receive a first voltage at a first conduction terminal of the other of the high side or low side drive transistor and having a second input terminal configured to receive a second voltage at a second conduction terminal of the other of the high side or low side drive transistor, the second comparator configured to compare the first and second voltages and output a second periodic signal having a second period indicative of motor speed; and
a motor speed calculation circuit having an input coupled to receive the first periodic signal and the second periodic signal, said motor speed calculation circuit configured to process the first periodic signal and the second periodic signal and determine the first period and second period.

9. The circuit of claim 8, wherein the motor speed calculation circuit is further configured to average the determined first period and second period to generate an average period.

10. The circuit of claim 9, wherein the motor speed calculation circuit is further configured to process the determined average period and calculate a speed of the motor.

11. The circuit of claim 8, wherein the motor speed calculation circuit is further configured to process the determined first period and second period and calculate a speed of the motor.

12. The circuit of claim 8, wherein the second comparator receives a mask signal, said mask signal being active during the brake mode and inactive during said portion of the tristate mode, said second comparator being further configured to output the second periodic signal, when the mask signal is inactive.

13. A circuit, comprising:
a first drive transistor having a first conduction terminal coupled to a first supply node and a second conduction terminal coupled to a first phase of a motor;
a first comparator having a first input terminal configured to receive a first voltage at the first supply voltage node and a second input terminal configured to receive a second voltage at the first phase of the motor, the first comparator configured to compare the first and second voltages and output a first periodic signal whose period is indicative of motor speed; and
a motor speed calculation circuit having an input coupled to receive the first periodic signal, said motor speed calculation circuit configured to process the first periodic signal and determine the motor speed.

14. The circuit of claim 13, wherein the motor speed calculation circuit is further configured to process the first periodic signal, determine a first period of said first periodic signal and calculate the motor speed from the determined first period.

15. The circuit of claim 14, wherein the motor is operable in a brake mode and a tristate mode, and wherein the motor speed calculation circuit is further configured to process the first periodic signal and determine the first period only during a portion of the tristate mode.

16. The circuit of claim 15, wherein said portion of the tristate mode is less than all of the tristate mode.

17. The circuit of claim 13, wherein the motor speed calculation circuit is further configured to process the first periodic signal, determine a first half-period of said first periodic signal and calculate the motor speed from the determined first half-period.

18. The circuit of claim 17, wherein the motor is operable in a brake mode and a tristate mode, and wherein the motor speed calculation circuit is further configured to process the first periodic signal and determine the first half-period only during a portion of the tristate mode.

19. The circuit of claim 18, wherein said portion of the tristate mode is less than all of the tristate mode.

20. A circuit, comprising:
a first drive transistor having a first conduction terminal coupled to a first supply node and a second conduction terminal coupled to a first phase of a motor;
a second drive transistor having a first conduction terminal coupled to a second supply node and a second conduction terminal coupled to the first phase of the motor;
a first comparator having a first input terminal configured to receive a first voltage at the first supply voltage node and a second input terminal configured to receive a second voltage at the first phase of the motor, the first comparator configured to compare the first and second voltages and output a first periodic signal whose period is indicative of motor speed;

a second comparator having a first input terminal configured to receive the second voltage at the first phase of the motor and receive a third voltage at the second supply node, the second comparator configured to compare the second and third voltages and output outputting a second periodic signal whose period is indicative of motor speed; and a motor speed calculation circuit having an input coupled to receive the first periodic signal, said motor speed calculation circuit configured to process the first periodic signal and the second periodic signal and determine the motor speed.

21. The circuit of claim 20, wherein the motor speed calculation circuit is further configured to process the first periodic signal and second periodic signal, determine a first period of said first periodic signal and a second period of said second periodic signal, and calculate the motor speed from the determined first and second periods.

22. The circuit of claim 21, wherein the motor speed calculation circuit is further configured to average the determined first period and second period to generate an average period.

23. The circuit of claim 22, wherein the motor speed calculation circuit is further configured to process the determined average period and calculate a speed of the motor.

24. A method, comprising:
sensing a first voltage at a motor phase;
sensing a second voltage at a first voltage supply node for the motor phase;
comparing with a voltage comparator circuit the sensed first and second voltages to generate a first periodic signal whose period is indicative of motor speed; and processing the first periodic signal to determine a first period of said first periodic signal and calculating the motor speed from the determined first period; and wherein the motor is operable in a brake mode and a tristate mode, and wherein processing the first periodic signal comprises determining the first period only during a portion of the tristate mode.

25. The method of claim 24, wherein said portion of the tristate mode is less than all of the tristate mode.

26. The method of claim 24, wherein processing the first periodic signal comprises determining a first half-period of said first periodic signal and calculating the motor speed from the determined first half-period.

27. The method of claim 26, wherein processing the first periodic signal comprises determining the first half-period only during a portion of the tristate mode.

28. The method of claim 27, wherein said portion of the tristate mode is less than all of the tristate mode.

29. The method of claim 24, wherein periods of the first periodic signal and a second periodic signal are indicative of motor speed, and wherein processing comprises processing the first and second periodic signals to determine the motor speed.

30. The method of claim 29, wherein processing the first and second periodic signals comprises determining a first period of said first periodic signal and a second period of said second periodic signal and calculating the motor speed from a determined average of the first and second periods.

31. The method of claim 29, wherein processing the first and second periodic signals comprises determining a first half-period of said first periodic signal and a second half-period of said second periodic signal and calculating the motor speed from a determined average of the first and second half-periods.

* * * * *